US012539042B2

(12) United States Patent
Subhash et al.

(10) Patent No.: US 12,539,042 B2
(45) Date of Patent: Feb. 3, 2026

(54) MULTI-MODAL IMAGING SYSTEM AND METHOD THEREFOR

(71) Applicants: Colgate-Palmolive Company, New York, NY (US); University of Washington, Seattle, WA (US)

(72) Inventors: Hrebesh Molly Subhash, Somerset, NJ (US); LaTonya Kilpatrick-Liverman, Princeton, NJ (US); Ruikang Wang, Bellevue, WA (US); Nhan Le, Seattle, WA (US)

(73) Assignees: Colgate-Palmolive Company, New York, NY (US); University of Washington, Seattle, WA (US)

( * ) Notice: Subject to any disclaimer, the term of this patent is extended or adjusted under 35 U.S.C. 154(b) by 634 days.

(21) Appl. No.: 17/771,649

(22) PCT Filed: Oct. 16, 2020

(86) PCT No.: PCT/US2020/055942
§ 371 (c)(1),
(2) Date: Apr. 25, 2022

(87) PCT Pub. No.: WO2021/091671
PCT Pub. Date: May 14, 2021

(65) Prior Publication Data
US 2022/0409056 A1    Dec. 29, 2022

Related U.S. Application Data

(60) Provisional application No. 62/932,062, filed on Nov. 7, 2019.

(51) Int. Cl.
*G06T 5/50* (2006.01)
*A61B 5/00* (2006.01)

(52) U.S. Cl.
CPC .......... *A61B 5/0066* (2013.01); *A61B 5/0088* (2013.01); *A61B 5/7425* (2013.01);
(Continued)

(58) Field of Classification Search
CPC ... A61B 5/0066; A61B 5/0088; A61B 5/7425; A61B 5/0071; A61B 5/1128;
(Continued)

(56) References Cited

U.S. PATENT DOCUMENTS 6,507,747 B1 *  1/2003  Gowda ............... A61B 5/0066
                                                     600/478
8,270,689 B2    9/2012  Liang et al.
(Continued)

FOREIGN PATENT DOCUMENTS

CN    101433458    5/2009
CN    101528116    9/2009
(Continued)

OTHER PUBLICATIONS

Liu et al. (Red fluorescence imaging for dental plaque detection and quantification: pilot study), published Sep. 18, 2017, pp. 1-12. (Year: 2017).*
(Continued)

*Primary Examiner* — Mohammed H Zuberi
*Assistant Examiner* — Ahamed I Nazar

(57) ABSTRACT

An imaging system may include: a first light source configured to emit a first source spectrum of collimated light; a second light source configured to emit a second source spectrum of light; a probe head configured to direct the first source spectrum and the second source spectrum toward tissue in an oral cavity and to collect a first feedback spectrum of light and a second feedback spectrum of light; an interferometry sub-system to generate an optical feedback signal using the first source spectrum; at least one optical sensor array for receiving the optical feedback signal and the second feedback spectrum; and at least one programmable processor to generate: a first diagnostic image of the tissue using the optical feedback signal; a second diagnostic image of the tissue using the second feedback spectrum; and a third diagnostic image from a combination of the first diagnostic image and the second diagnostic image.

21 Claims, 4 Drawing Sheets

(52) U.S. Cl.
CPC ...... *G06T 5/50* (2013.01); *G06T 2207/10048* (2013.01); *G06T 2207/30036* (2013.01)

(58) Field of Classification Search
CPC ..... A61B 5/743; A61B 2562/043; G06T 5/50; G06T 2207/10048; G06T 2207/30036; G06T 2207/10024; G06T 2207/10064; G06T 2207/10101; G06T 2207/10152; G06T 2207/20221; G06T 7/74; A61C 19/043
USPC ........................................................ 382/128
See application file for complete search history.

(56) References Cited

U.S. PATENT DOCUMENTS

| | | | | |
|---|---|---|---|---|
| 2004/0202356 | A1* | 10/2004 | Stookey | A61B 5/0088 382/128 |
| 2007/0099148 | A1* | 5/2007 | Wong | H04N 17/002 433/29 |
| 2009/0131800 | A1* | 5/2009 | Liang | A61B 5/0059 600/476 |
| 2010/0165089 | A1* | 7/2010 | Liang | A61B 5/0088 348/66 |
| 2012/0101390 | A1 | 4/2012 | Iftimia et al. | |

FOREIGN PATENT DOCUMENTS

| | | |
|---|---|---|
| EP | 2060227 | 5/2009 |
| EP | 2061372 | 5/2009 |
| JP | 2015117978 | 6/2015 |
| WO | 2021/091671 | 5/2021 |

OTHER PUBLICATIONS

Han et al. (Assessing the use of Quantitative Light-induced Fluorescence-Digitalas a clinical plaque assessment, published Dec. 2015, pp. 1-5) 2015.*

International Search Report and the Written Opinion of the International Searching Authority issued in International Application PCT/US2020/055942 mailed Feb. 2, 2021, pp. 1-9.

* cited by examiner

MULTI-MODAL IMAGING SYSTEM AND METHOD THEREFOR

BACKGROUND

Presently, dental professionals generally assess periodontal health using visual and tactile assessments in combination with periodontal pocket depth and tissue attachment measurements. These types of clinical assessments measure gingival inflammation based on the color, texture, bleeding on probing, and swelling of gingiva tissue. The probing is done to determine periodontal pocket depth, which is a measure that is highly correlated with clinical attachment loss, alveolar bone loss, and tooth loss.

A couple of drawbacks are present in the measurement of bleeding on probing to assess aspects of periodontal health. One drawback arises from the fact that people who smoke regularly often tend to display reduced bleeding. The gingiva tissue of smokers, therefore, may present differently in response to probing, and this may lead to incorrect assessments of the periodontal health of smokers. In addition, use of dental probes to measure pocket depth remains an invasive process. A need therefore exists for tools and procedures that are able to assess periodontal health without the drawbacks associated with probing of gingival tissue or using probes to measure the depth of periodontal pockets.

BRIEF SUMMARY

Exemplary embodiments according to the present disclosure are directed to multi-modal imaging systems and methods which employ both optical coherence tomography (OCT) and light induced auto-fluorescence (LIAF). The imaging system employs a probe head which directs a first source spectrum of light and a second source spectrum of light, each from a different light source, toward a surface in the oral cavity. The probe head also receives first and second feedback spectrum, each feedback spectrum resulting from one of the two source spectrum. The first feedback spectrum is processed through an interferometry sub-system and directed to a first optical sensor array to generate images in connection with the OCT imaging modality, and the second feedback spectrum is directed to a second optical sensor array to generate images in connection with the LIAF imaging modality. The imaging method includes steps of directing a first source spectrum and a second source spectrum of light toward a surface in the oral cavity. First and second feedback spectrum are received through the probe head. An optical feedback signal is generated using the first feedback spectrum in an interferometry sub-system, and the optical feedback signal is directed to a first optical sensor array to generate images as part of the OCT imaging modality. The second feedback spectrum is directed to a second optical sensor array to generate images as part of the LIAF imaging modality. In both the system and the method, images generated from the LIAF modality are useful in helping maintain the position and steadiness of the probe head in order to obtain higher quality images for the OCT modality. In addition, by combining images from both modalities, a more complete picture of periodontal health can be obtained without the drawbacks associated with probing.

In one aspect, the invention can be an imaging system including: a first light source configured to emit a first source spectrum of collimated light; a second light source configured to emit a second source spectrum of light; a probe head configured to direct the first source spectrum and the second source spectrum toward tissue in an oral cavity and to collect a first feedback spectrum of light and a second feedback spectrum of light, the first source spectrum interacting with the tissue to generate the first feedback spectrum and the second source spectrum interacting with the tissue to generate the second feedback spectrum, the second feedback spectrum being different from the first feedback spectrum; an interferometry sub-system configured to generate an optical feedback signal based on interference between the first source spectrum and the first feedback spectrum; at least one optical sensor array for receiving the optical feedback signal and the second feedback spectrum; and at least one programmable processor configured to generate: a first diagnostic image of the tissue using the optical feedback signal received at the at least one optical sensor array; a second diagnostic image of the tissue using the second feedback spectrum received at the at least one optical sensor array; and a third diagnostic image of the tissue from a combination of the first diagnostic image and the second diagnostic image.

In another aspect, the invention can be an imaging method including: emitting from a first light source in a first source spectrum of collimated light and from a second light source a second source spectrum of light; directing the first source spectrum and the second source spectrum from a probe head toward tissue in an oral cavity; collecting through the probe head a first feedback spectrum of light and a second feedback spectrum of light, the first source spectrum interacting with the tissue to generate the first feedback spectrum and the second source spectrum interacting with the tissue to generate the second feedback spectrum, the second feedback spectrum being different from the first feedback spectrum; generating, using an interferometry sub-system, an optical feedback signal based on interference between the first source spectrum and the first feedback spectrum; receiving, using at least one optical sensor array, the optical feedback signal and the second feedback spectrum; generating, using at least one programmable processor, a first diagnostic image of the tissue using the optical feedback signal received at the at least one optical sensor array; generating, using the at least one programmable processor, a second diagnostic image of the tissue using the second feedback spectrum received at the at least one optical sensor array; and generating, using the at least one programmable processor, a third diagnostic image of the tissue from a combination of the first diagnostic image and the second diagnostic image.

In still another aspect, the invention can be an imaging system including: a first light source configured to emit a first source spectrum of collimated light; a second light source configured to emit a second source spectrum of light; a probe head configured to direct the first source spectrum and the second source spectrum toward tissue in an oral cavity and to collect a first feedback spectrum of light and a second feedback spectrum of light, the first source spectrum interacting with the tissue to generate the first feedback spectrum and the second source spectrum interacting with the tissue to generate the second feedback spectrum, the second feedback spectrum being different from the first feedback spectrum; an interferometry sub-system configured to generate an optical feedback signal based on interference between the first source spectrum and the first feedback spectrum; at least one optical sensor array for receiving the optical feedback signal and the second feedback spectrum; and a display screen; and at least one programmable processor operably coupled to the display screen and configured to: generate a first diagnostic image using the interferometric signal received at the at least one optical sensor array; generate a second diagnostic image using the second feedback spectrum received at the at least one optical sensor array; generate a coarse positioning image using the second diagnostic image; and display at least one of the second diagnostic image or the coarse positioning image on the display screen while the probe head collects light in the first feedback spectrum and light in the second feedback spectrum.

In yet another aspect, the invention can be an imaging method including: emitting from a first light source in a first source spectrum of collimated light and from a second light source a second source spectrum of light; directing the first source spectrum and the second source spectrum from a probe head toward tissue in an oral cavity; collecting through the probe head a first feedback spectrum of light and a second feedback spectrum of light, the first source spectrum interacting with the tissue to generate the first feedback spectrum and the second source spectrum interacting with the tissue to generate the second feedback spectrum, the second feedback spectrum being different from the first feedback spectrum; generating, using an interferometry subsystem, an optical feedback signal based on interference between the first source spectrum and the first feedback spectrum; receiving, using at least one optical sensor array, the optical feedback signal and the second feedback spectrum; generating, using at least one programmable processor, a first diagnostic image of the tissue using the optical feedback signal received at the at least one optical sensor array; generating, using the at least one programmable processor, a second diagnostic image of the tissue using the second feedback spectrum received at the at least one optical sensor array; generating, using the at least one programmable processor, a coarse positioning image of the tissue from the second diagnostic image; and displaying on a display screen at least one of the second diagnostic image or the coarse positioning image on the display screen while the probe head collects light in the first feedback spectrum and light in the second feedback spectrum.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION

Figure 1:
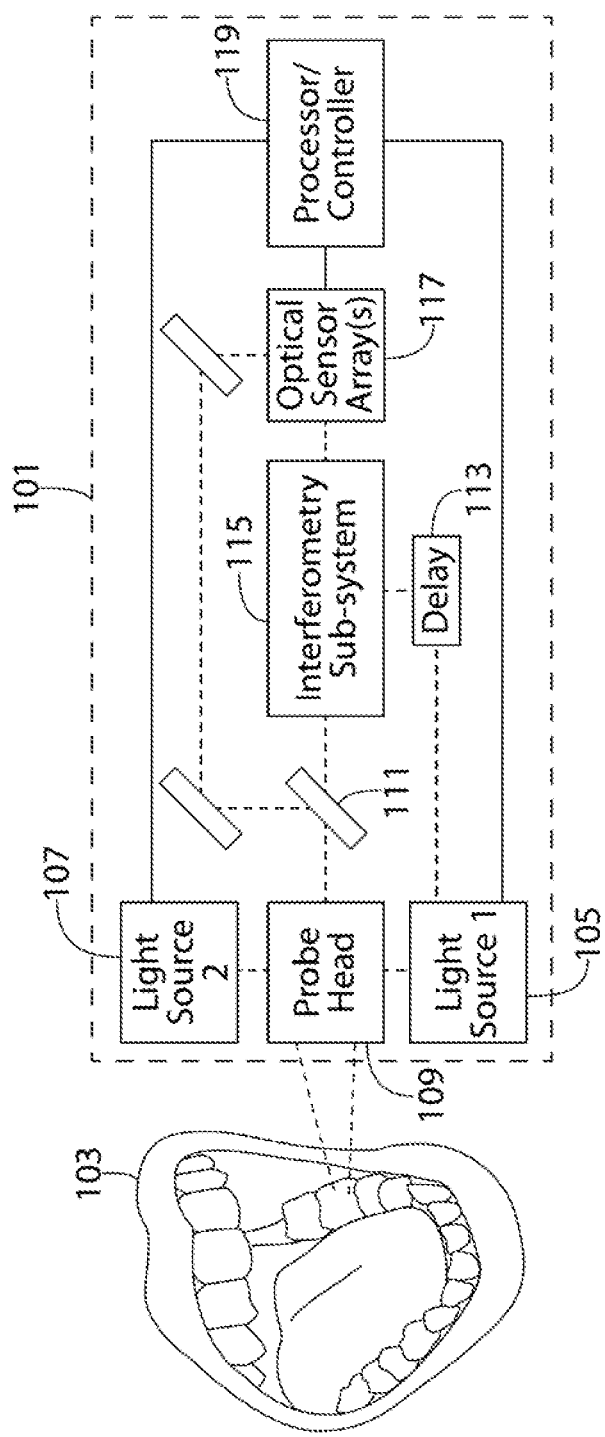
FIG. 1 schematically illustrates an imaging system in accordance with a first embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Features of the present invention may be implemented in software, hardware, firmware, or combinations thereof. The programmable processes described herein are not limited to any particular embodiment, and may be implemented in an operating system, application program, foreground or background processes, driver, or any combination thereof. The computer programmable processes may be executed on a single processor or on or across multiple processors.

Processors described herein may be any central processing unit (CPU), microprocessor, micro-controller, computational, or programmable device or circuit configured for executing computer program instructions (e.g. code). Various processors may be embodied in computer and/or server hardware and/or computing device of any suitable type (e.g. desktop, laptop, notebook, tablet, cellular phone, smart phone, PDA, etc.) and may include all the usual ancillary components necessary to form a functional data processing device including without limitation a bus, software and data storage such as volatile and non-volatile memory, input/output devices, a display screen, graphical user interfaces (GUIs), removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs is referred to hereinafter as a "programmable device", or just a "device" for short, and multiple programmable devices in mutual communication is referred to as a "programmable system". It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Turning in detail to the drawings, FIG. 1 illustrates an imaging system 101 in accordance with an embodiment of the present invention. The imaging system 101 is able to produce images of tissue within an oral cavity using two different imaging modalities, the first imaging modality being optical coherence tomography (OCT), and the second imaging modality being light induced auto-fluorescence (LIAF). In certain embodiments, the OCT imaging modality may operate in an anatomical OCT mode (providing microstructural images of the tissue), in a functional OCT mode (providing microvasculature images of the tissue), or in a Doppler OCT mode. The functional OCT mode is sometimes also referred to as optical coherence tomography angiography (OCTA). In certain embodiments, the OCT imaging modality may operate by alternating between two or more of the anatomical, functional, and Doppler modes.

The imaging system 101 may be positioned to image oral tissue 103 within an oral cavity, and it may be used to image both hard and soft oral tissues, along with various types of organic deposits on the hard or soft oral tissues. The imaging system 101 includes a first light source 105 and a second light source 107. Both light sources 105, 107 are optically coupled to a probe head 109. The first light source 105 produces collimated light in a first source spectrum and includes a pair of galvanometers (shown in FIG. 2) in order to scan the collimated light along both an x-axis and a y-axis, thereby enabling the OCT modality in a manner well-known in the art of OCT. Operation of the first light source 105, the second light source, and the galvanometers is controlled by the processor 119.

In certain embodiments, the first source spectrum has a spectral profile centered in the short-wave infrared spectrum, which ranges from wavelengths of about 900 nm to 1800 nm. In such embodiments the first source spectrum may have a spectral profile centered at a wavelength of approximately 1300 nm with a bandwidth of about 11 nm. The first source spectrum is directed to the probe head 109, and the probe head 109 directs the first source spectrum toward the tissue in the oral cavity. Light from the first source spectrum interacts with the tissue in the oral cavity to generate a first feedback spectrum of light, and that first feedback spectrum is in turn collected back into the probe head 109. In particular, light from the first source spectrum is reflected from multiple surfaces on or within the hard and soft tissues in the oral cavity, such that features of the surface of the tissue, the subsurface of the tissue, and/or deposits on the surface may be included as part of the images produced.

The second light source 107 produces light in a second source spectrum, which may be a spectral profile centered in the visible spectrum of light. In certain embodiments, the second source spectrum may be centered upon a wavelength of about 405 nm. In certain other embodiments, the second source spectrum may be centered upon a wavelength of about 375 nm. In certain embodiments, the first source spectrum and the second source spectrum are non-overlapping spectrum. In certain embodiments, the second light source 107 may be mounted directly on the probe head 109. In such embodiments, the second light source 107 may be mounted so that it is placed near or around an output aperture through which the first source spectrum exits the probe head 109 toward the tissue in the oral cavity. Light from the second source spectrum interacts with tissues and deposits on the tissues, if present, in the oral cavity to generate a second feedback spectrum of light, and that second feedback spectrum is in turn collected back into the probe head 109. In particular, light from the second source spectrum induces an auto-fluorescence emission in hard and/or soft oral tissues and in porphyrins associated with plaque.

Both the first and second feedback spectrum are received through the probe head 109 and directed toward a dichroic mirror 111, which separates the first feedback spectrum from the second feedback spectrum. The first feedback spectrum is directed into an interferometry sub-system 115, and the second feedback spectrum is directed toward an optical sensor array 117. The optical sensor array 117 may be any appropriate type of optical sensor array, including a CMOS sensor, a CCD sensor, and the like. The interferometry sub-system 115 also receives the first source spectrum of light from the first light source 105 through an optical delay 113, which serves to create a path difference between the first source spectrum and the first feedback spectrum. The interferometry sub-system 115 combines the first source spectrum and the first feedback spectrum to generate an optical feedback signal from interference between the two spectra. The structure and manner of operation of such an interferometry sub-system 115 is well-known in the art of OCT systems, and as such the details of the interferometry sub-system 115 is not discussed here in detail.

The optical feedback signal generated by the interferometry sub-system 115 is directed to the optical sensor array 117, and output from the optical sensor array 117 based on the optical feedback signal is analyzed by the programmable processor 119 so that diagnostic images of the tissue from the OCT modality may be generated. The diagnostic images based upon the optical feedback signal may be microstructural images, microvasculature images, or doppler images, depending upon the OCT modality employed. Similarly, the second feedback spectrum is directed to the optical sensor array 117, and output from the optical sensor array 117 based on the second feedback spectrum is analyzed by the programmable processor 119 so that diagnostic images of the tissue from the LIAF modality may be generated. In certain embodiments, the optical sensor array 117 may include multiple sensor arrays, such that the optical feedback signal is directed toward one of the sensor arrays, and the second feedback signal is directed toward another of the sensor arrays.

Since the second feedback spectrum is based upon auto-fluorescence emissions, the diagnostic images of the tissue from the LIAF modality are images of the external surfaces of the tissues along with any deposits (e.g., plaque) on such external surfaces. As discussed below, the diagnostic images based upon the second feedback spectrum may be a red-channel fluorescence image, a green channel fluorescence image, or a calculated combination of the red and green channels. In certain embodiments, the programmable processor 119 may combine the diagnostic images based upon the optical feedback signal with the diagnostic images based upon the second feedback spectrum in order to generate a third type of diagnostic image. In certain embodiments, this third type of diagnostic image may be generated by overlaying one of the OCT-based diagnostic images and the LIAF-based diagnostic image onto the other of these two diagnostic images.

Figure 2:
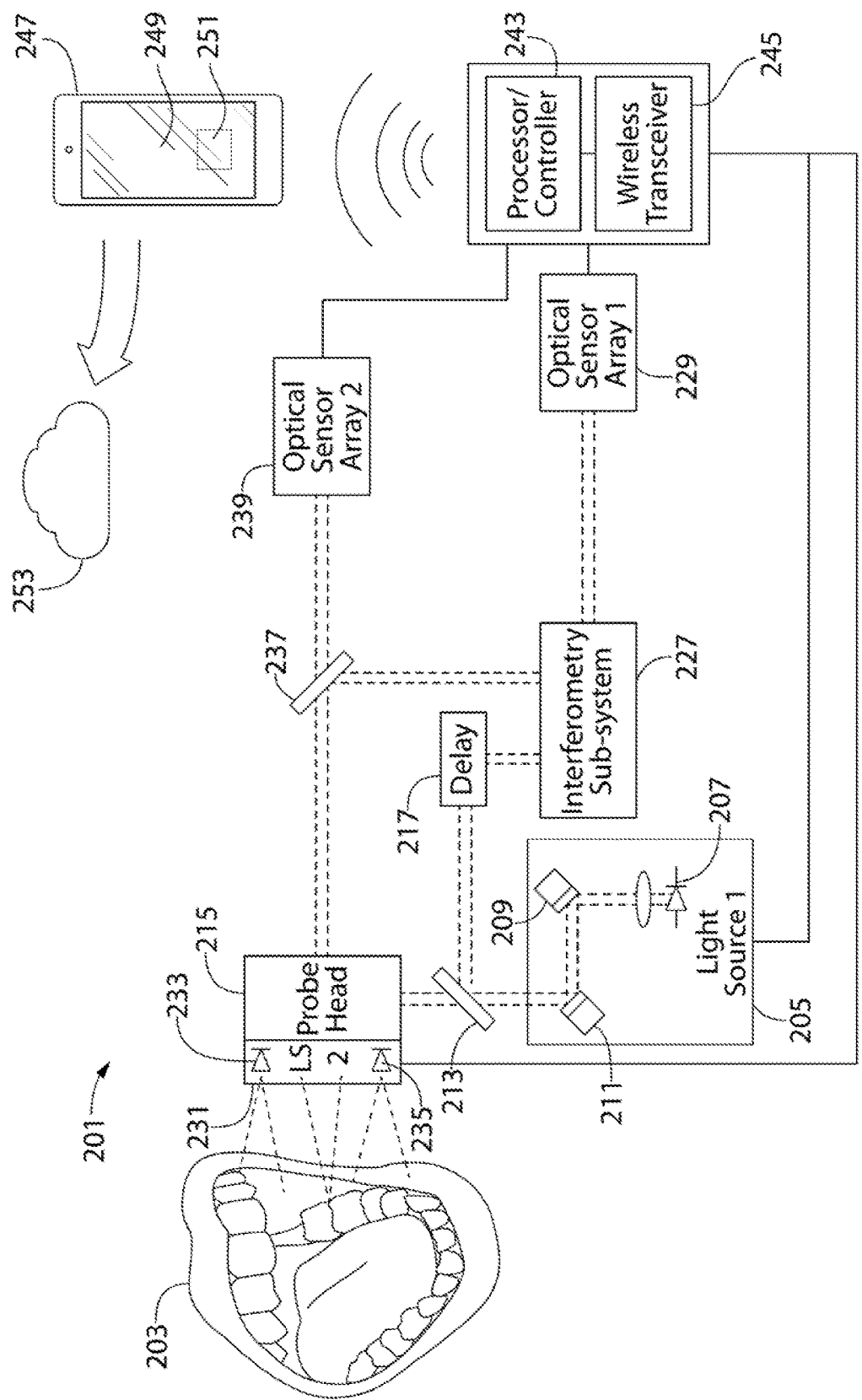
FIG. 2 schematically illustrates an imaging system in accordance with a second embodiment of the present invention.

FIG. 2 illustrates another embodiment of an imaging system 201 positioned to image oral tissue, such as teeth, within an oral cavity 203. Soft oral tissue within the oral cavity 203 may also be imaged using the imaging system 201. The imaging system 201 is able to produce images of tissue within the oral cavity using two different imaging modalities, the first imaging modality being optical coherence tomography (OCT), and the second imaging modality being light induced auto-fluorescence (LIAF). In certain embodiments, the OCT imaging modality may operate in an anatomical OCT mode (providing microstructural images of the tissue), in a functional OCT mode (providing microvasculature images of the tissue), or in a Doppler OCT mode. In certain embodiments, the OCT imaging modality may operate by alternating between two or more of the anatomical, functional, and Doppler modes.

The imaging system 201 includes a first light source 205 which is optically coupled to the probe head 215. The first light source 205 includes a light generating element 207 and two galvanometers 209, 211. The light generating element 207 produces collimated light in a first source spectrum, and the galvanometers 209, 211 are controlled to scan the collimated light along both an x-axis and a y-axis. Operation of the first light source 205, including the galvanometers 209, 211, is controlled by the programmable processor 243. In certain embodiments, the first source spectrum has a spectral profile centered in the short-wave infrared spectrum, which ranges from wavelengths of about 900 nm to 1800 nm. In such embodiments the first source spectrum may have a spectral profile centered at a wavelength of approximately 1300 nm with a bandwidth of about 11 nm.

The first light source 205 is optically coupled to the probe head 215. The first source spectrum emitted by the light source 205 is divided by a beam splitter 213. Part of the first source spectrum is directed to the probe head 215, and the other part of the first source spectrum is directed to the optical delay 217. The probe head 215 directs the first source spectrum toward the tissue in the oral cavity. Light from the first source spectrum interacts with the tissue in the oral cavity to generate a first feedback spectrum of light, and that first feedback spectrum is in turn collected back into the probe head 109. In particular, light from the first source spectrum is reflected from multiple surfaces on or within the tissue in the oral cavity, such that features of the surface of the tissue, the subsurface of the tissue, and/or deposits on the surface may be included as part of the images produced.

The second light source 231 produces light in a second source spectrum. The second light source 231 is mounted to an outer surface of the probe head 215, such that when the probe head 215 directs the first source spectrum toward the oral cavity, the second source spectrum is also directed toward the oral tissue. The second light source 231 includes multiple light emitting elements 233, 235 positioned on the outer surface of the probe head 215. The second source spectrum may have a spectral profile centered in the visible spectrum of light. In certain embodiments, the second source spectrum may be centered upon a wavelength of about 405 nm. In certain other embodiments, the second source spectrum may be centered upon a wavelength of about 375 nm. In certain embodiments, the first source spectrum and the second source spectrum are non-overlapping spectrum. Light from the second source spectrum interacts with tissues and deposits on the tissues, if present, in the oral cavity to generate a second feedback spectrum of light, and that second feedback spectrum is in turn collected back into the probe head 215. In particular, light from the second source spectrum induces an auto-fluorescence emission in hard and/or soft oral tissues and in porphyrins associated with plaque.

Both the first and second feedback spectrum are received through the probe head 215 and directed toward a dichroic mirror 237, which separates the first feedback spectrum from the second feedback spectrum. The first feedback spectrum is directed into an interferometry sub-system 227, and the second feedback spectrum is directed toward a second optical sensor array 239. In certain embodiments, the second feedback spectrum may be passed through a broadband filter prior to being received at the second optical sensor array 239. In such embodiments, a 450 nm cut-on broadband filter may be desirable in order to filter out strong reflections from the second source spectrum, as doing so can improve the signal-noise-ratio of the second feedback spectrum. The interferometry sub-system 227 also receives the first source spectrum of light from the first light source 205 through an optical delay 217, which serves to create a path difference between the first source spectrum and the first feedback spectrum. The interferometry sub-system 227 combines the first source spectrum and the first feedback spectrum to generate an optical feedback signal through interference between the two spectrum.

The optical feedback signal generated by the interferometry sub-system 227 is directed to the first optical sensor array 229, and output from the first optical sensor array 229 based on the optical feedback signal is analyzed by the programmable processor 243 so that diagnostic images of the tissue from the OCT modality may be generated. The diagnostic images based upon the optical feedback signal may be microstructural images, microvasculature images, or doppler images. Similarly, the second feedback spectrum is directed to the second optical sensor array 239, and output from the second optical sensor array 239 based on the second feedback spectrum is analyzed by the programmable processor 243 so that diagnostic images of the tissue from the LIAF modality may be generated.

Since the second feedback spectrum is based upon auto-fluorescence emissions, the diagnostic images of the tissue from the LIAF modality essentially are images of the external surfaces of the tissues along with any deposits (e.g., plaque) on such external surfaces. Again, the diagnostic images based upon the second feedback spectrum may be a red-channel fluorescence image, a green channel fluorescence image, or a calculated combination of the red and green channels. In certain embodiments, the programmable processor 243 may combine the diagnostic images based upon the optical feedback signal with the diagnostic images based upon the second feedback spectrum in order to generate a third type of diagnostic image. In certain embodiments, this third type of diagnostic image may be generated by overlaying one of the OCT-based diagnostic image and the LIAF-based diagnostic image onto the other of these two diagnostic images.

The programmable processor 243 is communicably coupled to a wireless transceiver 245. The programmable processor 243 may be programmed to transmit output from the optical sensor arrays 229, 239 and/or the diagnostic images using the wireless transceiver 245 to a remote device 247, which includes a display screen 249 for displaying one or more of the diagnostic images. The wireless transceiver 245 may utilize any appropriate wireless protocol, such as WiFi or Bluetooth, with the wireless protocol not to be limited unless expressly stated in the claims. The remote device 247 may be any suitable type of programmable device, such as a desktop or laptop computer, smart phone, tablet, PDA, and the like. The remote device 247 is not limiting of the claimed invention unless otherwise expressly stated in the claims. In certain embodiments, the processor 243 may communicate the output from the optical sensor arrays 229, 239 directly to the remote device 247. Although the imaging system 201 shows only a single remote device 247, in certain embodiments the processor 243 may communicate images and/or data to more than one remote device 247. In such embodiments, the processor 243 may communicate the diagnostic images to one remote device, and the output from the optical sensor arrays 229, 239 directly to another remote device. As shown, the remote device 247 also includes a programmable processor 251. In certain embodiments, the programmable processor 251 may perform the functions of generating the first, second, and third diagnostic images. In certain embodiments, the programmable processor 251 may perform any processing function described herein as being performed by the programmable processor 243.

The remote device 247 may also communicate with a cloud server 253 using one or more public or private local area networks (LAN) and/or wide area networks (WAN). In certain embodiments, the remote device 247 may communicate the diagnostic images, or any other data associated with the diagnostic images, with the cloud server 253. In certain embodiments, the cloud server 253 may be used to store historical data associated with the diagnostic images. In still other embodiments, the cloud server 255 may be used as a data aggregator, and the cloud server 253 may be used to perform additional data analysis on the diagnostic images or any other data associated with the diagnostic images.

Figure 3:
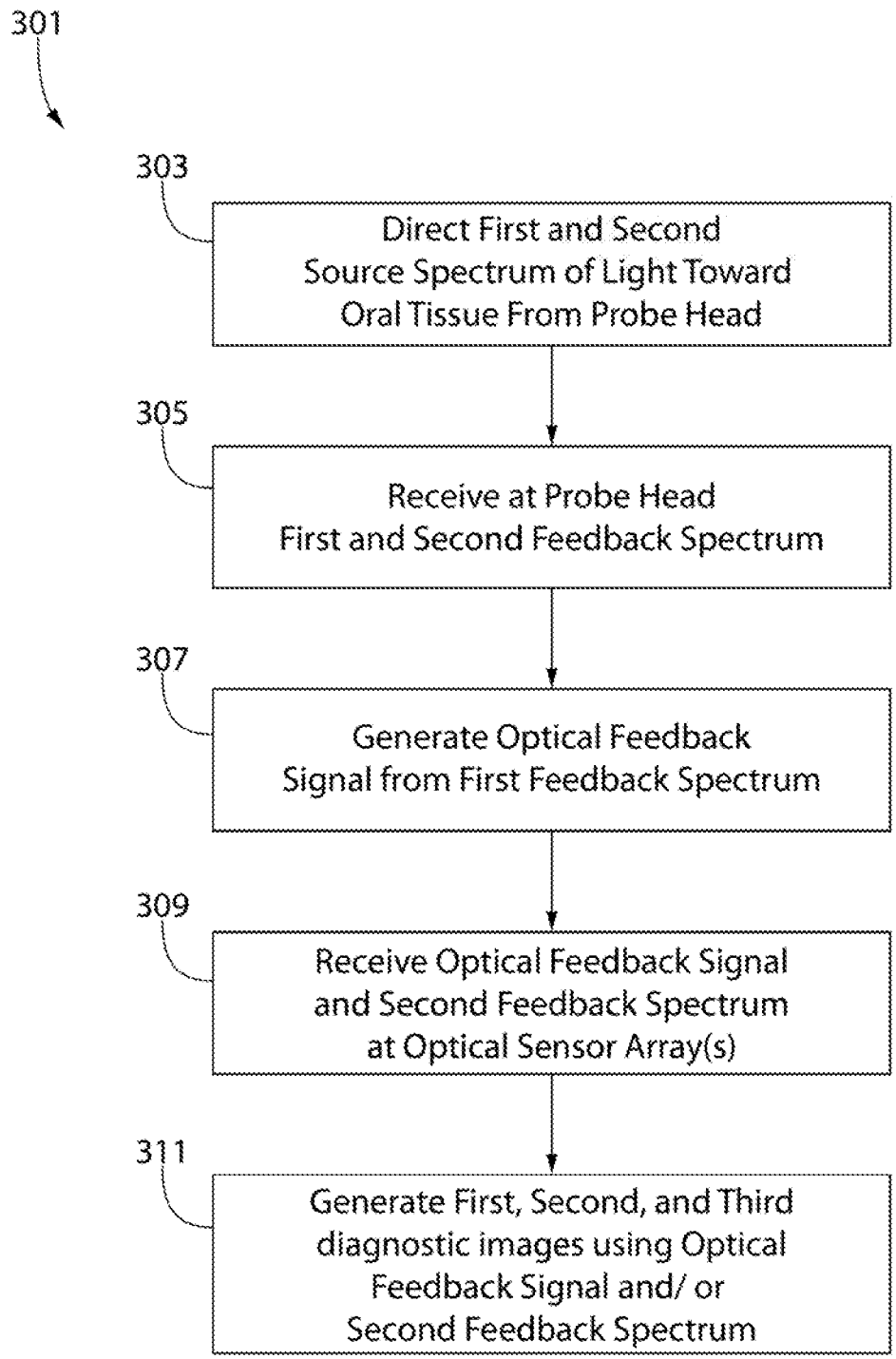
FIG. 3 is a flowchart showing a first process for imaging a specimen.

A first process for assessing periodontal health is shown in the flowchart 301 of FIG. 3. The programmable processors described above in connection with embodiments of the invention may be programmed to follow the process of the flowchart 301. In addition, the capabilities and parameters of the embodiments described above may be incorporated into the process of the flowchart 301. In certain embodiments, the processes shown and described herein may performed by a plurality of processors, with each processor being programmed to perform only a portion of the process, and with all the processors together being programmed to perform the entirety of the process.

The first step 303 of the process is to emit the first source spectrum of collimated light from a first light source and to emit the second source spectrum of light from a second light source and use a probe head to direct both the first source spectrum and the second source spectrum toward oral tissue within the oral cavity. As described above, the first source spectrum is collimated light and scanned along two axes to be used as part of the OCT (structural, functional, or Doppler) modality, and the second source spectrum is light that induces auto-fluorescence emissions to be used as part of the LIAF modality. In the next step 305, the first feedback spectrum of light and the second feedback spectrum of light are received at the probe head. The first feedback spectrum is the result of the first source spectrum reflected off external and internal microstructural surfaces of the tissues and/or deposits on such tissues, and the second feedback spectrum is the light resulting from auto-fluorescence of the tissues and/or deposits on such tissues. In the next step 307, the first feedback spectrum is processed through an interferometry sub-system to generate an optical feedback signal. The optical feedback signal is the result of interference between the first feedback spectrum and the first source spectrum. The next step 309 of the process is receiving the optical feedback signal and the second feedback spectrum at least one optical sensor array. In certain embodiments, a first optical sensor array may be used to receive the optical feedback signal, and a second optical sensor array may be used to receive the second feedback spectrum. In the last step 311 of the process shown in the flowchart 301, the output from the at least one optical sensor array is used by a programmable processor to generate three diagnostic images of the oral tissue. The first diagnostic image comes from the OCT modality and is generated using the optical feedback spectrum. The second diagnostic image comes from the LIAF modality and is generated using the second feedback spectrum. The third diagnostic image is generated from a combination of the first diagnostic image and the second diagnostic image.

In certain embodiments, the second diagnostic image may be generated through contrast enhancement using two different color channels present in the second feedback spectrum. In certain embodiments, the contrast enhancement may serve to enhance the visibility of plaque in the second diagnostic image while simultaneously reducing the red channel background caused by hard tissues (teeth) within the oral cavity. Such contrast enhancement may be referred to herein as plaque-autofluorescence (PAF) contrast enhancement. In such embodiments, the contrast enhancement may be achieved by subtracting a red channel times a calibrated constant from a green channel as follows:

$$I_{PAF}(x,y)=I_R(x,y)-k \cdot I_G(x,y), \quad (1)$$

where $I_{PAF}$ is the enhanced intensity of autofluorescence from plaque, $I_R$ and $I_G$ denote the intensity of autofluorescence from plaque in the red-channel and green-channel, respectively (which may be referred to as, respectively, rLIAF and gLIAF); k is a calibrated constant, which is used to suppress auto-fluorescence signal of the tooth in red-channel and is usually less than 1; and x, y is the position of the pixels in the diagnostic image undergoing contrast enhancement. The calibrated constant, k, is typically system specific (optical sensor sensitivity, optical sensor channel filter, excitation light source, etc.) and needs an appropriate calibration to maximize the quality of the diagnostic images based on plaque autofluorescence. When using this PAF contrast enhancement, the green channel may be considered to extend between wavelengths of about 450 nm-600 nm, and the red channel may be considered to extend between wavelengths of about 550 nm-800 nm. Also, in such embodiments, the blue channel, extending from between about 400 nm-550 nm, may not included in the diagnostic image. The red and green channels in particular are useful for measuring properties of dentin and plaque. Specifically, protein (mainly collagen) within the dentin is the source of the green auto-fluorescence, while the porphyrin carrying plaque biofilm is the source of the red auto-fluorescence.

In certain embodiments, the third diagnostic image may be the result of placing the first and second diagnostic images side-by-side so that both modalities may be viewed simultaneously. In certain other embodiments, the third diagnostic image may be the result of overlaying one of the first diagnostic image and the second diagnostic image onto the other of these two diagnostic images. Such a combined diagnostic image would show information from both modalities by aligning structural features of the imaged oral tissue. In such an embodiment, the programmable processor may be configured to provide the user with the capability of adjusting the transparency of one or both of the diagnostic images so as to provide greater viewing flexibility while assessing periodontal health.

Although not shown in the flowchart 301, a last step in the process of assessing periodontal health in certain embodiments may include displaying one or more of the first diagnostic image, the second diagnostic image, and the third diagnostic image on a display screen.

Figure 4:
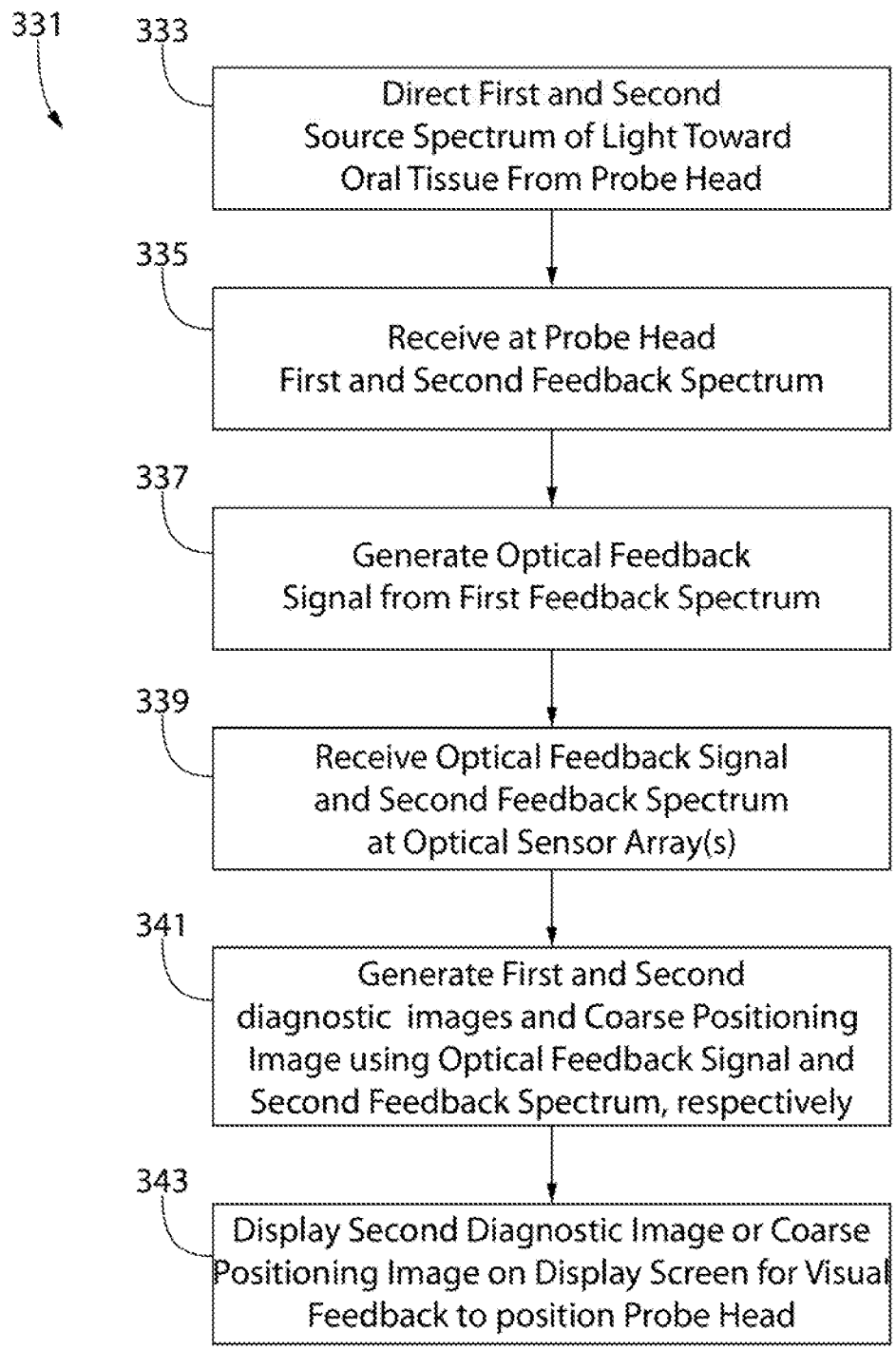
FIG. 4 is a flowchart showing a second process for imaging a specimen.

A second process for assessing periodontal health is shown in the flowchart 331 of FIG. 4. The programmable processors described above in connection with embodiments of the invention may be programmed to follow the process of the flowchart 331. In addition, the capabilities and parameters of the embodiments described above may be incorporated into the process of the flowchart 331. In certain embodiments, the processes shown and described herein may performed by a plurality of processors, with each processor being programmed to perform only a portion of the process, and with all the processors together being programmed to perform the entirety of the process.

The first step 333 of the process is to emit the first source spectrum of collimated light from a first light source and to emit the second source spectrum of light from a second light source and use a probe head to direct both the first source spectrum and the second source spectrum toward oral tissue within the oral cavity. As described above, the first source spectrum is collimated light and scanned along two axes to be used as part of the OCT (structural, functional, or Doppler) modality, and the second source spectrum is light that induces auto-fluorescence emissions to be used as part of the LIAF modality. In the next step 335, the first feedback spectrum of light and the second feedback spectrum of light are received at the probe head. The first feedback spectrum is the result of the first source spectrum reflected off external and internal microstructural surfaces of the tissues and/or deposits on such tissues, and the second feedback spectrum is the light resulting from auto-fluorescence of the tissues and/or deposits on such tissues. In the next step 337, the first feedback spectrum is processed through an interferometry sub-system to generate an optical feedback signal. The optical feedback signal is the result of interference between the first feedback spectrum and the first source spectrum. The next step 339 of the process is receiving the optical feedback signal and the second feedback spectrum at least one optical sensor array. In certain embodiments, a first optical sensor array may be used to receive the optical feedback signal, and a second optical sensor array may be used to receive the second feedback spectrum. In the next step 341, the output from the at least one optical sensor array is used by a programmable processor to generate two diagnostic images of the oral tissue and a coarse positioning image. The first diagnostic image comes from the OCT modality and is generated using the optical feedback spectrum. The second diagnostic image comes from the LIAF modality and is generated using the second feedback spectrum.

In certain embodiments, the second diagnostic image may be generated through contrast enhancement as described above. The coarse positioning image may be generated from the second diagnostic image. In certain embodiments, the coarse positioning image may be generated from the contrast enhanced second diagnostic image. In each case, an edge detected image is generated by performing an edge detection analysis of the second diagnostic image to identify edges of hard tissue in the second diagnostic image. Next the coarse positioning image is generated by comparing the edge detected image to a reference image of the oral tissue to determine a coarse position of the probe head within the oral cavity. In certain embodiments, the edge detected image may be overlaid onto the reference image to generate the coarse positioning image, such that the registration/visual relationship between the edge detected image and the reference image, when shown on the display screen while the probe head is receiving the first and second feedback spectrum, provide the user with an indication of where the probe head is positioned with respect to the oral tissue that is being imaged and how steady the position of the probe head is being maintained.

In the last step 343 in the process of assessing periodontal health of the process as shown in the flowchart 331, one or more of the first diagnostic image, the second diagnostic image, and the coarse positioning image is displayed on a display screen. As indicated above, the coarse positioning image may be displayed on the display screen while the probe head is in the oral cavity and the first and second feedback spectrum are being received. In certain embodiments, the second diagnostic image and the coarse positioning image may be displayed while the probe head is in the oral cavity and the first and second feedback spectrum are being received.

The LIAF and OCT modalities described as part of the present systems and methods disclosed herein operate in parallel, allowing a dental professional to visualize tooth and plaque fluorescence, tissue structure, and blood flow. The LIAF-OCT system provides extensive information covering health and disease states of the oral cavity. For example, both the LIAF and OCT modalities provide information on plaque content. The OCT modality provides information on total plaque, while the LIAF modality detects the more mature and potentially more pathogenic plaque formations. Thus, the combined OCT-LIAF system makes it possible to evaluate the initial onset of more pathogenic dental plaque around the gingival margins and the changes that occur to the gingival structure and vasculature as a result.

Both imaging modalities also provide information involving tooth structural anomalies. The OCT modality provides 3D depth resolved images of tooth demineralization, while the LIAF modality reflects tooth structure anomalies via changes in green fluorescence.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An imaging system comprising:
a first light source configured to emit a first source spectrum of collimated light;
a second light source configured to emit a second source spectrum of light;
a probe head configured to direct the first source spectrum and the second source spectrum toward tissue in an oral cavity and to collect a first feedback spectrum of light and a second feedback spectrum of light, the first source spectrum interacting with the tissue to generate the first feedback spectrum and the second source spectrum interacting with the tissue to generate the second feedback spectrum, the second feedback spectrum being different from the first feedback spectrum;
an interferometry sub-system configured to generate an optical feedback signal based on interference between the first source spectrum and the first feedback spectrum;
at least one optical sensor array for receiving the optical feedback signal and the second feedback spectrum; and
at least one programmable processor configured to generate:
a first diagnostic image of the tissue using the optical feedback signal received at the at least one optical sensor array;
a second diagnostic image of the tissue using the second feedback spectrum received at the at least one optical sensor array; and
a third diagnostic image of the tissue from a combination of the first diagnostic image and the second diagnostic image, wherein the second diagnostic image is generated through contrast enhancement by subtracting a red channel times a calibrated constant from a green channel, the red channel and the green channel each being extracted from the second feedback spectrum, and wherein, during a common acquisition period, the at least one optical sensor array concurrently receives the first feedback spectrum of light corresponding to the first source spectrum and the second feedback spectrum of light corresponding to the second source spectrum.

2. The imaging system of claim 1, wherein the third diagnostic image comprises an overlay of one of the first diagnostic image and the second diagnostic image onto the other of the first diagnostic image and the second diagnostic image.

3. The imaging system of claim 1, further comprising a display screen operably coupled to the at least one programmable processor, wherein the at least one programmable processor is configured to display one or more of the first diagnostic image, the second diagnostic image, and the third diagnostic image on the display screen.

4. The imaging system of claim 1 further comprising:
a display screen; and
the least one programmable processor operably coupled to the display screen and configured to:
generate a coarse positioning image using the second diagnostic image; and
display at least one of the second diagnostic image or the coarse positioning image on the display screen while the probe head collects light in the first feedback spectrum and light in the second feedback spectrum.

5. The imaging system of claim 4, wherein the at least one processor is further configured to:

generate an edge detected image by performing an edge detection analysis of the second diagnostic image to identify edges of hard tissue in the second diagnostic image; and
generate the coarse positioning image by comparing the edge detected image to a reference image to determine a coarse position of the probe head within the oral cavity.

6. The imaging system of claim 1, wherein the first source spectrum is in an infrared spectrum of light.

7. The imaging system of claim 1, wherein the second source spectrum is in a visible spectrum of light.

8. The imaging system of claim 1, wherein the first source spectrum and the second source spectrum are non-overlapping spectrum.

9. The imaging system of claim 1, wherein the first feedback spectrum results from reflectance.

10. The imaging system of claim 1, wherein the second feedback spectrum results from fluorescence, and wherein the second diagnostic image comprises an image of an external surface of the tissue.

11. The imaging system of claim 1, wherein the first diagnostic image comprises a microstructural image of the tissue, the microstructural image being generated by optical coherence tomography (OCT).

12. The imaging system of claim 1, wherein a specimen comprises tissue and the first diagnostic image comprises a microvasculature image of the tissue, the microvasculature image being generated by optical coherence tomography angiography (OCTA).

13. The imaging system of claim 1, further comprising an optical filter configured to separate the first feedback spectrum from the second feedback spectrum.

14. An imaging method comprising:
emitting from a first light source in a first source spectrum collimated light and from a second light source a second source spectrum of light;
directing the first source spectrum and the second source spectrum from a probe head toward tissue in an oral cavity;
collecting through the probe head a first feedback spectrum of light and a second feedback spectrum of light, the first source spectrum interacting with the tissue to generate the first feedback spectrum and the second source spectrum interacting with the tissue to generate the second feedback spectrum, the second feedback spectrum being different from the first feedback spectrum;
generating, using an interferometry sub-system, an optical feedback signal based on interference between the first source spectrum and the first feedback spectrum;
receiving, using at least one optical sensor array, the optical feedback signal and the second feedback spectrum;
generating, using at least one programmable processor, a first diagnostic image of the tissue using the optical feedback signal received at the at least one optical sensor array;
generating, using the at least one programmable processor, a second diagnostic image of the tissue using the second feedback spectrum received at the at least one optical sensor array; and
generating, using the at least one programmable processor, a third diagnostic image of the tissue from a combination of the first diagnostic image and the second diagnostic image, wherein the second diagnostic image is generated through contrast enhancement by subtracting a red channel times a calibrated constant from a green channel, the red channel and the green channel each being extracted from the second feedback spectrum.

15. The imaging method of claim 14, wherein generating the third diagnostic image comprises placing one of the first diagnostic image and the second diagnostic image as an overlay onto the other of the first diagnostic image and the second diagnostic image.

16. The imaging method of claim 14, further comprising displaying on a display screen one or more of the first diagnostic image, the second diagnostic image, and the third diagnostic image.

17. The imaging method of claim 14 further comprising:
generating, using the at least one programmable processor, a coarse positioning image of the tissue from the second diagnostic image; and
displaying on a display screen at least one of the second diagnostic image or the coarse positioning image on the display screen while the probe head collects light in the first feedback spectrum and light in the second feedback spectrum.

18. The imaging method of claim 17, wherein generating the coarse positioning image comprises:
generating an edge detected image by performing an edge detection analysis of the second diagnostic image to identify edges of hard tissue in the second diagnostic image; and
generating the coarse positioning image by comparing the edge detected image to a reference image to determine a coarse position of the probe head within the oral cavity.

19. The imaging method of claim 14, wherein the first diagnostic image comprises a microvasculature image of the tissue, the microvasculature image being generated by optical coherence tomography angiography (OCTA).

20. The imaging method of claim 14, wherein the at least one optical sensor array concurrently receives the optical feedback signal and the second feedback spectrum.

21. The imaging system of claim 7, wherein the second source spectrum is centered upon a wavelength of approximately 375 nm or 405 nm.

* * * * *